(12) United States Patent
Windmueller et al.

(10) Patent No.: US 8,807,434 B1
(45) Date of Patent: Aug. 19, 2014

(54) TECHNIQUES FOR GENERATING CUSTOMIZED TWO-DIMENSIONAL BARCODES

(75) Inventors: David K Windmueller, Croton On Hudson, NY (US); Daniel Jules Switkin, Brooklyn, NY (US); Dror Michael Marcus, Tel Aviv (IL); Asaf Revach, Nordia (IL)

(73) Assignee: Google Inc., Mountain View, CA (US)

( * ) Notice: Subject to any disclaimer, the term of this patent is extended or adjusted under 35 U.S.C. 154(b) by 134 days.

(21) Appl. No.: 13/569,324

(22) Filed: Aug. 8, 2012

(51) Int. Cl.
*G06K 9/18* (2006.01)

(52) U.S. Cl.
USPC ............... 235/462.09; 382/232; 235/462.15

(58) Field of Classification Search
USPC .......... 382/232; 707/706, 713, 721, 737, 749, 707/758, 767, 768; 709/223, 225, 245; 715/530; 235/462.01, 462.09, 462.15, 235/454
See application file for complete search history.

(56) References Cited

U.S. PATENT DOCUMENTS

| | | | |
|---|---|---|---|
| 6,594,687 B1 * | 7/2003 | Yap et al. ...................... | 709/203 |
| 6,594,697 B1 | 7/2003 | Praitis et al. | |
| 7,120,871 B1 * | 10/2006 | Harrington .................... | 715/205 |
| 7,376,752 B1 | 5/2008 | Chudnovsky et al. | |
| 7,467,196 B2 * | 12/2008 | Di Luoffo et al. ............ | 709/223 |
| 7,702,162 B2 * | 4/2010 | Cheong et al. ................. | 382/232 |
| 7,751,629 B2 * | 7/2010 | Cheong et al. ................. | 382/232 |
| 8,023,746 B2 * | 9/2011 | Ackley et al. .................. | 382/232 |
| 8,176,069 B2 * | 5/2012 | Timm et al. .................... | 707/767 |

OTHER PUBLICATIONS

Non-Final Office Action dated Sep. 12, 2013 issued in corresponding U.S. Appl. No. 13/569,257.
Notice of Allowance dated Dec. 23, 2013 issued in corresponding U.S. Appl. No. 13/569,257.
Cox, R., "QArt Codes," researchIrsc, http://research.swtch.com/qart, Apr. 12, 2012, 11 pages.

* cited by examiner

*Primary Examiner* — Daniel St. Cyr

(57) ABSTRACT

A computer-implemented technique can receive, at a computing device, a uniform resource locator (URL) for a web page and a plurality of images. A number of pixels corresponding to a desired resolution for encoding the images determined and the images are converted to modified images having the desired resolution. The technique can then generate an animated two-dimensional barcode using a plurality of two-dimensional barcodes generated for the plurality of images, respectively. A specific two-dimensional barcode can be generated by: generating first data representative of the modified image and appending the first data to either an end of the URL to obtain a first modified URL or after a terminator bit of the two-dimensional barcode. The two-dimensional barcode can then be generated using the first and second data and third data representative of an error correction code (ECC) and that is based on the first data and the second data.

20 Claims, 6 Drawing Sheets

TECHNIQUES FOR GENERATING CUSTOMIZED TWO-DIMENSIONAL BARCODES

FIELD

The present disclosure relates to two-dimensional barcodes and, more particularly, to techniques for generating customized two-dimensional barcodes.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Two-dimensional barcodes can store more data than conventional barcodes, e.g., a universal product code (UPC), while still providing for fast readability/scanning. Two-dimensional barcodes can include quick response (QR) codes, Aztec codes, Data Matrix codes, and the like. Two-dimensional barcodes generally include dark (black) squares or dots arranged in a square or rectangular pattern on a contrasting (white) background. The dark (black) squares represent data stored by the two-dimensional barcode. For example, the data can be a uniform resource locator (URL) for a web page. A mobile computing device, e.g., a mobile phone, executing two-dimensional barcode reader software can read (or "scan") the two-dimensional barcode. Scanning of the two-dimensional barcode can cause the mobile computing device to automatically access the stored data, e.g., the web page indicated by the URL.

SUMMARY

A computer-implemented technique is presented. The technique can include receiving, at a first computing device including one or more processors, a uniform resource locator (URL) for a web page. The technique can include receiving, at the first computing device, a plurality of images that collectively form an animation. The technique can include determining, at the first computing device, a number of pixels corresponding to a desired resolution for encoding each of the plurality of images. The technique can include converting, at the first computing device, the plurality of images to a plurality of modified images each having the number of pixels. The technique can include generating, at the first computing device, a quick response (QR) code for each of the plurality of modified images using the URL to obtain a plurality of QR codes. The generating of a specific QR code can include: generating first data representative of a specific modified image, appending the first data (i) at an end of the URL after a parameter indicator character to obtain a first modified URL or (ii) after a terminator bit of the QR code, generating second data representative of the first modified URL or the URL, and generating third data representative of an error correction code (ECC) based on the first data and the second data. The specific QR code can be generated based on the first data, the second data, and the third data, wherein the first data, the second data, and the third data are associated with a first portion, a second portion, and a third portion of the specific QR code, respectively, and wherein the first, second, and third portions are distinct, non-overlapping portions of the QR code. The technique can include generating, at the first computing device, an animated QR code based on the plurality of QR codes. The technique can also include outputting, at the first computing device, the animated QR code.

Another computer-implemented technique is also presented. The technique can include receiving, at a first computing device including one or more processors, a URL for a web page. The technique can include receiving, at the first computing device, a plurality of images that collectively form an animation. The technique can include determining, at the first computing device, a number of pixels corresponding to a desired resolution for encoding each of the plurality of images. The technique can include converting, at the first computing device, the plurality of images to a plurality of modified images each having the number of pixels. The technique can include generating, at the first computing device, a two-dimensional barcode for each of the plurality of modified images using the URL to obtain a plurality of two-dimensional barcodes. The generating of a specific two-dimensional barcode can include: generating first data representative of a specific modified image, appending the first data (i) at an end of the URL after a parameter indicator character to obtain a first modified URL or (ii) after a terminator bit of the two-dimensional barcode, generating second data representative of the first modified URL or the URL, and generating third data representative of an ECC based on the first data and the second data, wherein the specific two-dimensional barcode is generated based on the first data, the second data, and the third data. The technique can include generating, at the first computing device, an animated two-dimensional barcode based on the plurality of two-dimensional barcodes. The technique can also include outputting, at the first computing device, the animated two-dimensional barcode.

In some embodiments, when the two-dimensional barcodes are QR codes, the generating of the specific two-dimensional barcode further comprises: selecting, at the first computing device, one of a plurality of masks to obtain a selected mask, each of the plurality of masks representing a different mathematical pattern for inverting pixels of the specific two-dimensional barcode, wherein the selected mask represents the one of the plurality of masks that produces less than or equal to an acceptable number of optical problems when applied to the specific two-dimensional barcode, and applying, at the first computing device, the selected mask to the specific two-dimensional barcode to obtain a specific modified two-dimensional barcode, wherein generating the animated two-dimensional barcode uses the specific modified two-dimensional barcode, the specific modified two-dimensional barcode specifying the selected mask.

In other embodiments, the technique further includes obtaining a second modified URL that is associated with the URL and is shorter than the URL, wherein obtaining the second modified URL includes: transmitting, from the first computing device, a request to shorten the URL to a server via a network, the server being configured to perform URL shortening, and receiving, at the first computing device, the second modified URL from the server in response to the request, wherein the generating of the plurality of two-dimensional barcodes includes using the second modified URL.

In some embodiments, generating the first data representative of the specific modified image includes: generating, at the first computing device, a string of bits representative of the specific modified image, and generating, at the first computing device, one or more characters representative of the string of bits to obtain the first data, wherein the first data is appended at the end of the URL after the parameter indicator character to obtain the first modified URL and the second data is generated using the first modified URL.

In other embodiments, generating the first data representative of the specific modified image includes generating, at the first computing device, a string of bits representative of the specific modified image to obtain the first data, wherein the first data is appended after the terminator bit of the specific two-dimensional barcode and the second data is generated using the URL.

In some embodiments, the first data, the second data, and the third data are associated with a first portion, a second portion, and a third portion of the two-dimensional barcode, respectively, wherein the first, second, and third portions are distinct, non-overlapping portions of the two-dimensional barcode.

In other embodiments, the first portion is arranged between the second and third portions of the two-dimensional barcode.

In some embodiments, the first computing device is a server, wherein the URL and the plurality of images are received at the first computing device via a network, and wherein the animated two-dimensional barcode is output via the network.

In other embodiments, the URL and the plurality of images are received at the first computing device via the network from a user at a second computing device, and wherein the animated two-dimensional barcode is output via the network to the user at the second computing device.

In some embodiments, when scanned by a second computing device executing a two-dimensional barcode reader at any time during a cycle of the animated two-dimensional barcode, the animated two-dimensional barcode causes the second computing device to transmit a request for the web page associated with the first modified URL to a web server, the request causing the web server to ignore the first data appended at the end of the first modified URL after the parameter indicator character or after the terminator bit, thereby causing the web server to transmit a source document for the web page indicated by the URL to the second computing device.

A computing device is also presented. The computing device can include a data input device, one or more processors, and a data output device. The data input device can be configured to: receive a URL for a web page, and receive a plurality of images that collectively form an animation. The one or more processors can be configured to: determine a number of pixels corresponding to a desired resolution for encoding each of the plurality of images, convert the plurality of images to a plurality of modified images each having the number of pixels, and generate a two-dimensional barcode for each of the plurality of modified images using the URL to obtain a plurality of two-dimensional barcodes. The generating of a specific two-dimensional barcode can include: generating first data representative of a specific modified image, appending the first data (i) at an end of the URL after a parameter indicator character to obtain a first modified URL or (ii) after a terminator bit of the specific two-dimensional barcode, generating second data representative of the first modified URL or the URL, and generating third data representative of an error correction code (ECC) based on the first data and the second data, wherein the specific two-dimensional barcode is generated based on the first data, the second data, and the third data. The one or more processors can also be configured to generate an animated two-dimensional barcode based on the plurality of two-dimensional barcodes. The data output device can be configured to output the animated two-dimensional barcode.

In some embodiments, when the two-dimensional barcodes are QR codes, the one or more processors are further configured to generate the specific two-dimensional barcode by: selecting one of a plurality of masks to obtain a selected mask, each of the plurality of masks representing a different mathematical pattern for inverting pixels of the specific two-dimensional barcode, wherein the selected mask represents the one of the plurality of masks that produces less than or equal to an acceptable number of optical problems when applied to the specific two-dimensional barcode, and applying, at the first computing device, the selected mask to the specific two-dimensional barcode to obtain a specific modified two-dimensional barcode, wherein the one or more processors are configured to generate the animated two-dimensional barcode based on the specific modified two-dimensional barcode, the specific modified two-dimensional barcode specifying the selected mask.

In other embodiments, the one or more processors are further configured to obtain a second modified URL that is associated with the URL and is shorter than the URL by: transmitting, from the data output device, a request to shorten the URL to a server via a network, the server being configured to perform URL shortening, and receiving, at the data input device, the second modified URL from the server in response to the request, wherein the one or more processors are configured to generate the plurality of two-dimensional barcodes using the second modified URL.

In some embodiments, the one or more processors are further configured to generate the first data representative of the specific modified image by: generating a string of bits representative of the specific modified image, and generating one or more characters representative of the string of bits to obtain the first data, wherein the one or more processors are configured to append the first data at the end of the URL after the parameter indicator character to obtain the first modified URL and to generate the second data using the first modified URL.

In other embodiments, the one or more processors are further configured to generate the first data representative of the specific modified image by: generating a string of bits representative of the specific modified image to obtain the first data, wherein the one or more processors are configured to append the first data after the terminator bit of the specific two-dimensional barcode and to generate the second data using the URL.

In some embodiments, the first data, the second data, and the third data are associated with a first portion, a second portion, and a third portion of the two-dimensional barcode, respectively, wherein the first, second, and third portions are distinct, non-overlapping portions of the two-dimensional barcode.

In other embodiments, the first portion is arranged between the second and third portions of the two-dimensional barcode.

In some embodiments, the computing device is a server, wherein the data input device is configured to receive the URL and the plurality of images via a network from a user at another computing device, and wherein the data output device is configured to output the animated two-dimensional barcode via the network to the user at the other computing device.

In other embodiments, when scanned by another computing device executing a two-dimensional barcode reader at any time during a cycle of the animated two-dimensional barcode, the animated two-dimensional barcode causes the other computing device transmit a request for the web page associated with the first modified URL to a web server, wherein the request causes the web server to ignore the first data appended at the end of the first modified URL after the parameter indicator character or after the terminator bit, thereby causing the web server to transmit a source document for the web page associated with the URL to the other computing device.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Two-dimensional barcodes, e.g., quick response (QR) codes, generally include two portions: a data portion and an error correction code (ECC) portion. The data portion of the two-dimensional barcode can represent the encoded data stored by the two-dimensional barcode, e.g., a uniform resource locator (URL) for a web page. The ECC portion of the two-dimensional barcode can represent an ECC for verifying the data and for recovering the data when scanning of the data portion of the two-dimensional barcode fails. Scanning of the data portion of the two-dimensional barcode can fail when the data portion of the two-dimensional barcode is damaged. For example, if the two-dimensional barcode was printed on paper, the data portion of the two-dimensional barcode could be smudged or smeared, or the corresponding portion of the paper could be torn.

A user can generate a two-dimensional barcode at a computing device. The user can input the data, e.g., a URL for a web page, and the computing device can generate the two-dimensional barcode, including the ECC portion. The user may want to customize the two-dimensional barcode. For example, the user may want to insert an image, e.g., a picture or a company logo, into the two-dimensional barcode. Inserting the image into the two-dimensional barcode, however, can render the data portion of the two-dimensional barcode unreadable. The ECC portion of the two-dimensional barcode can be used to recover the data. The ECC, however, may only be capable of recovering a portion of the data. Further, smearing or other damage to the data portion and/or the ECC portion may render the two-dimensional barcode unreadable.

Accordingly, techniques are presented for generating customized two-dimensional barcodes. The customization can be initiated by a user, and generally involves the user providing a URL for a web page (the data) and one or more images (the customization). It should be appreciated that while customization by inserting a user image is discussed herein, other customization could be performed using the techniques of the present disclosure, e.g., inserting user text or word art. The techniques generally provide for the generation of customized two-dimensional barcodes having retrievable data when scanned without using ECC. The techniques can also shorten the URL stored by the two-dimensional barcode in order to decrease the amount of data stored by the two-dimensional barcode, which can provide more area of the two-dimensional barcode in which to display an image. In some implementations, the techniques can generate customized, animated two-dimensional barcodes formed by a plurality of customized two-dimensional barcodes corresponding to a plurality of images, respectively.

Figure 1:
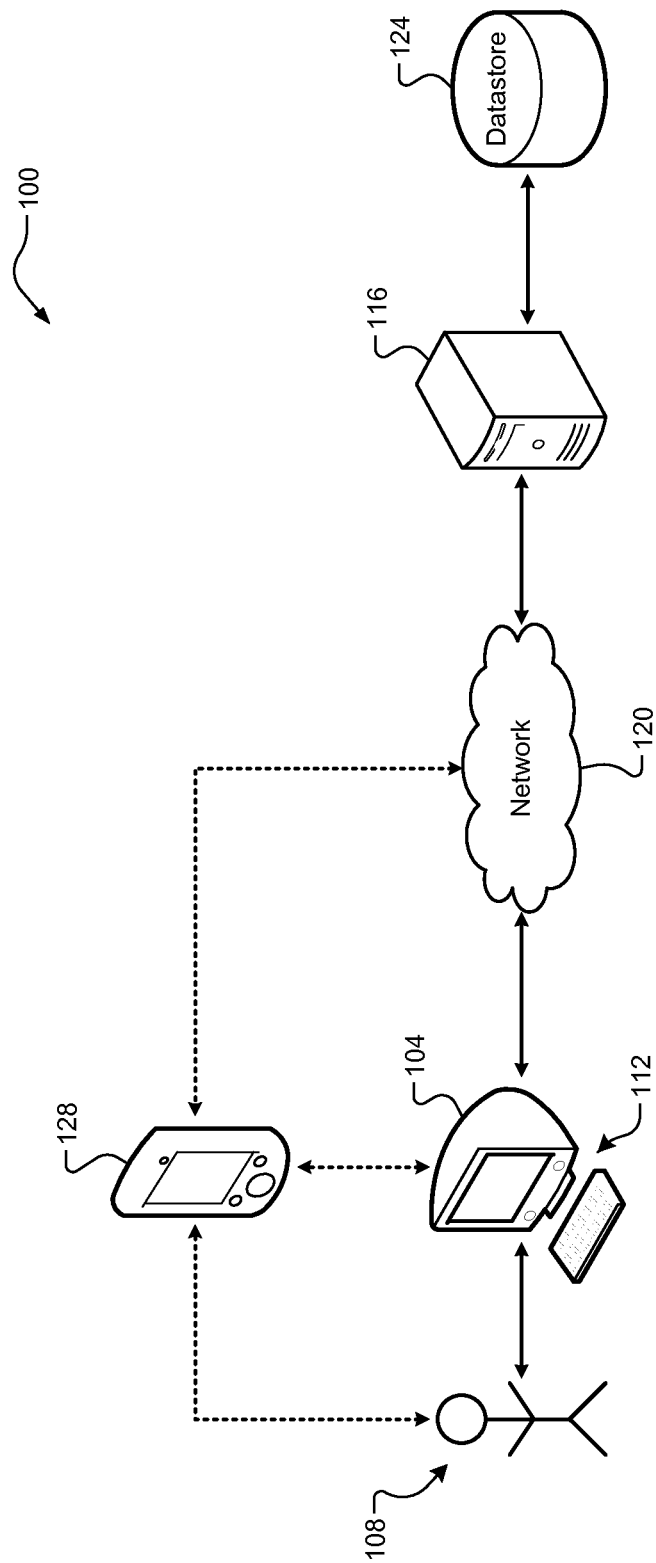
FIG. 1 is an illustration of a computing network including an example computing device according to some implementations of the present disclosure.

Referring now to FIG. 1, a computing network 100 including an example computing device 104 according to some implementations of the present disclosure is illustrated. For example, the computing device 104 can be a desktop computer (shown), a laptop computer, a tablet computer, a mobile phone, or another suitable computing device including one or more processors. A user 108 can input information to and receive information from the computing device 104 via a device interface 112. For example, the device interface 112 can include a keyboard, a mouse, and a display. The computing network 100 can further include a server 116 in communication with the computing device 104 via a network 120. The network 120 can include a local area network (LAN), a wide area network (WAN), e.g., the Internet, or a combination thereof. The device interface 112 can include suitable communication components, e.g., a transceiver, for communication by the computing device 104 via the network 120. The server 116 can be configured to write and/or retrieve data at a datastore 124. For example, the server 116 can be configured to perform URL shortening using the datastore 124 according to the techniques of the present disclosure. The server 116 could also host one or more web pages.

The computing network 100 can further include a mobile computing device 128. For example, the mobile computing device 128 can be a tablet computer, a mobile phone (shown), or another suitable mobile computing device including one or more processors. The mobile computing device 128 can be associated with the user 108 or with another user. The mobile computing device 128 can be configured to execute two-dimensional barcode reader software and, therefore, can be used to read or scan customized two-dimensional barcodes or customized, animated two-dimensional barcodes generated and displayed at the computing device 104 according to the techniques of the present disclosure (described in detail below). The mobile computing device 128, therefore, can also communicate via the network 120 in order to access the URL specified by the scanned, customized two-dimensional barcode.

Figure 2:
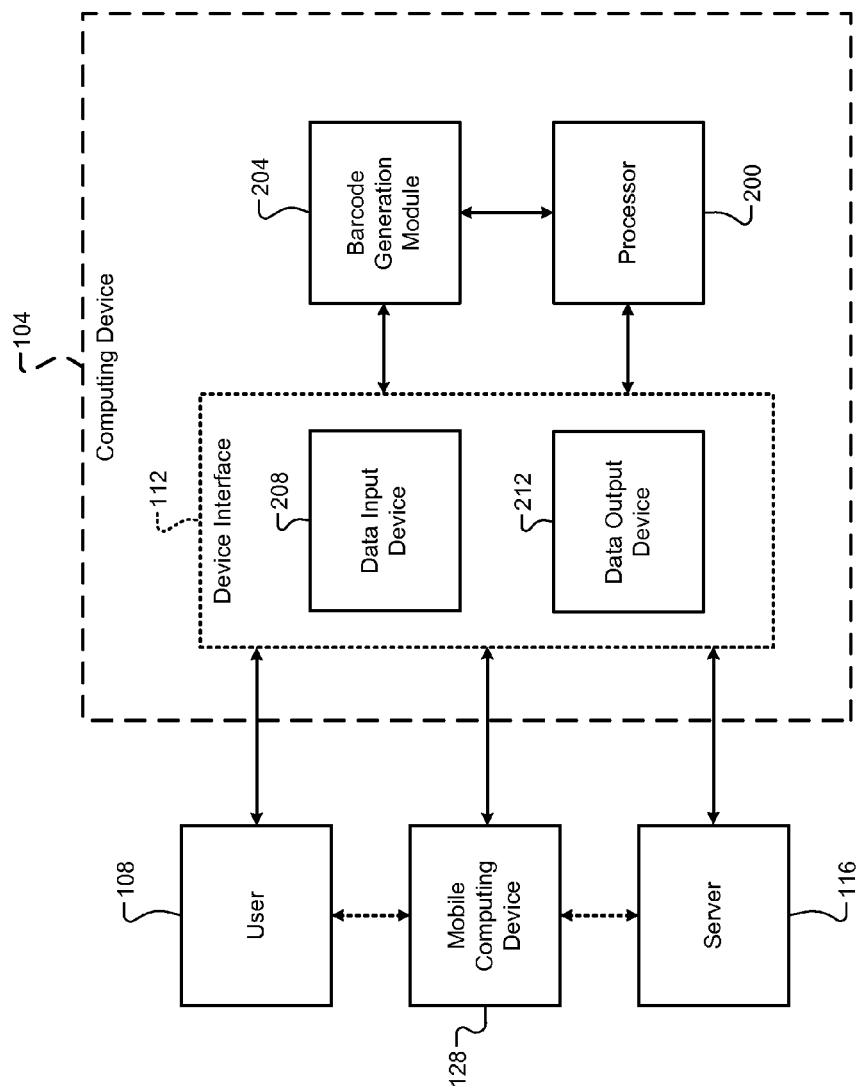
FIG. 2 is a functional block diagram of the example computing device of FIG. 1 including an example barcode generation module according to some implementations of the present disclosure.

Referring now to FIG. 2, a functional block diagram of the computing device 104 is illustrated. The computing device 104 can include the device interface 112, a processor 200, and a barcode generation module 204. The computing device 104 can also include other suitable components, such as memory (not shown). It should be appreciated that while one processor 200 is shown, the computing device 104 can include two or more processors operating in a parallel or distributed architecture. Further, the one or more processors can wholly or partially execute the barcode generation module 204.

The device interface 112 can include a data input device 208 and a data output device 212. It should be appreciated that while one data input device 208 and one data output device 212 are shown, the device interface 112 can include two or more data input devices and/or two or more data output devices. The data input device 208 generally refers to any suitable device configured to receive data. For example, the data input device 208 can be one of the various user interface components (keyboard, mouse, etc.). Additionally or alternatively, the data input device 208 can be a communication component, e.g., a transceiver, configured for receiving data via the network 120. Similarly, the data output device 212 generally refers to any suitable device configured to output or transmit data. For example, the data output device 212 can be one of the various user interface components (a display). Additionally or alternatively, the data output device 212 can be a communication component, e.g., the transceiver, configured for transmitting data via the network 120.

The processor 200 can control operation of the computing device 104. As previously mentioned, it should be appreciated that while one processor 200 is shown, two or more processors can be implemented in a parallel or distributed architecture. The processor 200 can perform functions including, but not limited to, loading and executing an operating system of the computing device 104, controlling communication between the computing device 104 and other devices, e.g., devices on the network 120, via the device interface 112, and controlling interaction between users, e.g., user 108, and the computing device 104 via the device interface 112. Further, as previously mentioned, the processor 200 can wholly or partially execute the barcode generation module 204.

The barcode generation module 204 can be configured to generate a customized two-dimensional barcode. The two-dimensional barcode can be a QR code, an Aztec code, a Data Matrix code, or any other suitable two-dimensional barcode. The data to encode in the two-dimensional barcode can be a URL for a web page. It should be appreciated that other data can be encoded in the two-dimensional barcode, such as an e-mail address or a physical address. The customization of the two-dimensional barcode can be an image to embed in the two-dimensional barcode. The URL and/or the image can be input by the user 108. Alternatively, the image could be received at the computing device 104 (via the device interface 112) from another device, e.g., a server on the network 120. Specific interaction between the barcode generation module 204 and the other elements illustrated in FIG. 2 can be seen in FIG. 3 and is described in detail below.

Figure 3:
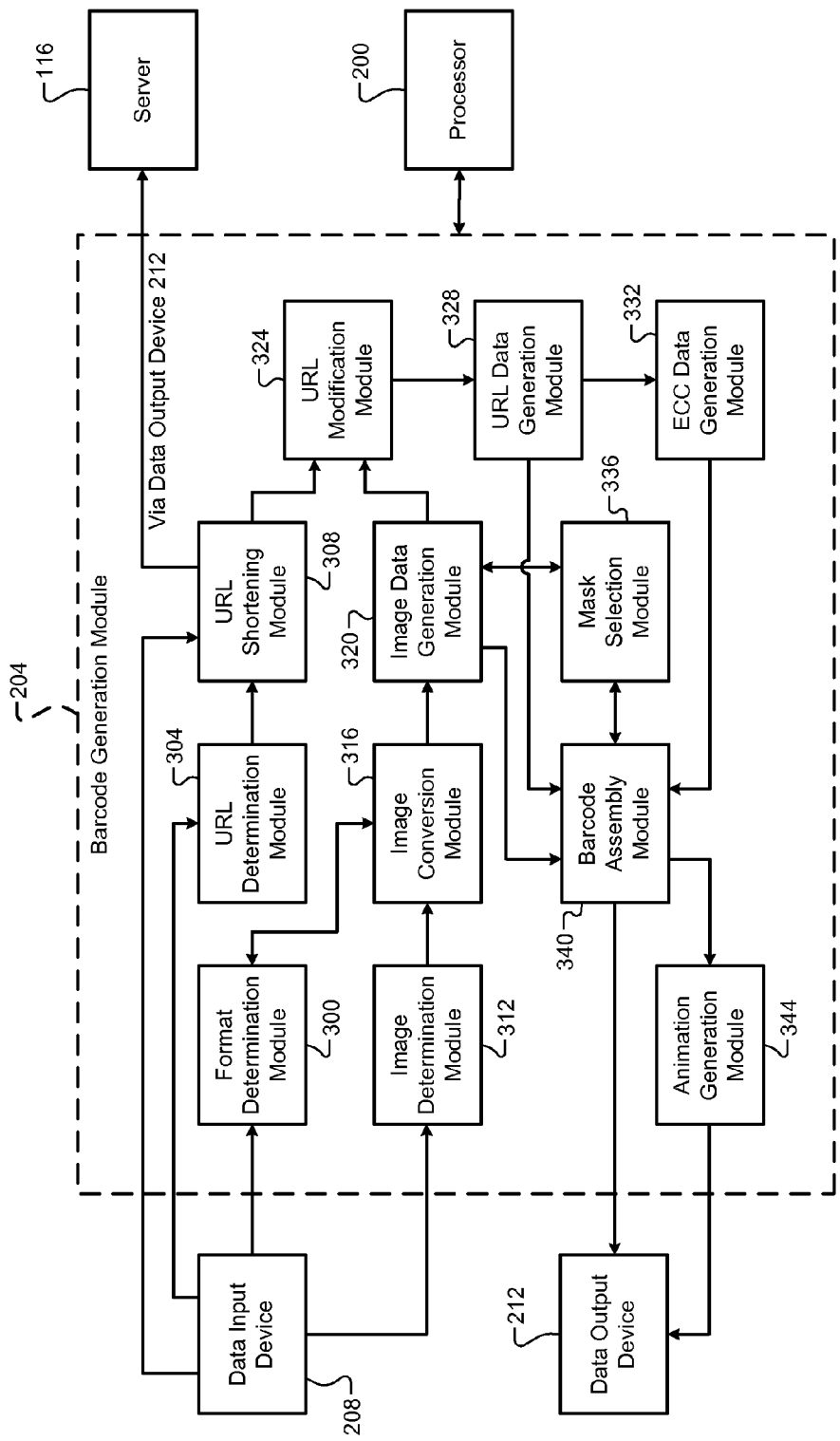
FIG. 3 is a functional block diagram of the example barcode generation module of FIG. 2.

Referring now to FIG. 3, a functional block diagram of the barcode generation module 204 is illustrated. The barcode generation module 204 can include a format determination module 300, a URL determination module 304, a URL shortening module 308, an image determination module 312, an image conversion module 316, an image data generation module 320, a URL modification module 324, a URL data generation module 328, an ECC data generation module 332, a mask selection module 336, a barcode assembly module 340, and an animation generation module 344. The barcode generation module 204 can also include other suitable components, such as memory (not shown). Further, as previously mentioned, the processor 200 can wholly or partially execute the various modules of the barcode generation module 204.

The format determination module 300 can determine a format for the two-dimensional barcode. The format could be specified by the user 108 or could be predetermined as a default parameter for the computing device 104. The format can indicate which type of two-dimensional barcode to be generated. As previously mentioned, the two-dimensional barcode can be a QR code, an Aztec code, a Data Matrix code, or any other suitable two-dimensional barcode. The format can further indicate various parameters associated with the specific type of two-dimensional barcode, e.g., an encoding format for the two-dimensional barcode. For example only, QR codes can also have certain required patterns: position indicators, alignment indicators, and timing indicators. The format can further indicate other information, such as a resolution of the two-dimensional barcode, which can be used in converting the image. It should be appreciated that the format can further indicate other information suitable for two-dimensional barcodes.

The URL determination module 304 can determine a URL for a web page. For example, the URL can be input by the user 108 via the device interface 112 of the computing device 104. It should be appreciated that while URLs for web pages are discussed herein, the two-dimensional barcode could alternatively be encoded with any other suitable data, e.g., other data indicating an address or identity of the web page. In some implementations, the URL shortening module 308 can receive the URL from the URL determination module 304 and can generate a second modified URL that is both associated with the URL (the web page) and is shorter than the URL. In other words, the second modified URL still provides access to the web page, e.g., links to the URL, but the second modified URL has a shorter length than the URL and therefore requires less data to encode. For example, the URL shortening module 308 can generate the second modified URL using a third-party URL shortening engine.

URL shortening engines generally receive a URL as input and generate a shorter, unique URL (the second modified URL) using the URL. The URL shortening engine can then store both the URL and the second modified URL in a table, which is used to redirect a computing device, e.g., computing device 104, accessing the second modified URL to the URL. As previously mentioned, the server 116 can be configured to perform URL shortening, and the corresponding table can be implemented in the datastore 124. For example only, using the bitly URL shortening engine (http://www.bitly.com), the user 108 can input (via the computing device 104) the URL http://www.userspersonalwebpage.com, and the bitly URL shortening engine can output the second modified URL http://bit.ly/K4kakn. When accessed by a computing device, e.g., the mobile computing device 128, the second modified URL http://bit.ly/K4kakn can link/redirect the computing device to the URL http://www.userspersonalwebpage.com.

The image determination module 312 can determine the image for customizing the two-dimensional barcode. The image can be input by the user 108 via the device interface 112 of the computing device 104, or the image can be received at the computing device 104 via the device interface 112 from another device on the network 120. As previously mentioned, it should be appreciated that while customization of two-dimensional barcodes using images is discussed herein, the techniques of the present disclosure can be applied to customize a two-dimensional barcode with other data, such as text or word art. Therefore, the term "image" can generally refer to any data to be used in customizing the two-dimensional barcode.

The image conversion module 316 can receive the image from the image determination module 312 and can convert the image to obtain a modified image. The modified image can have the resolution specified by the format of the two-dimensional barcode. The resolution of the modified image is generally less than the resolution of the image. In other words, two-dimensional barcodes generally have lower resolutions (less pixels) than most images. Further, in some implementations, the image conversion module 316 can also convert a color image (or an image having a plurality of different colors) into a modified image having a black/white color scheme or another color scheme having acceptable contrast differences.

The image data generation module 320 can receive the modified image from the image conversion module 316 and can generate first data representative of the modified image. The image data generation module 320 can generate first data including a string of bits representing the modified image. The string of bits can be extracted from the modified image according to a pattern associated with the format of the two-dimensional barcode. For example only, the string of bits could include a bit (a binary 0 or 1) for each pixel of the modified image, e.g., indicating a black or white pixel. In some implementations, the image data generation module 320 can then convert the string of bits to one or more characters. For example only, the string of bits "00111" could be converted to the character "k". The image data generation module 320 can generate a first portion of the two-dimensional barcode by encoding either the string of bits or the one or more characters (described in detail below). It should be appreciated that while converting the modified image to a string of bits and then to one or more characters is discussed, other conversion techniques and other data representations, e.g., hexadecimal or alphanumeric, could be used.

The string of bits, however, may not be directly convertible to one or more characters. In other words, string of bits may violate the format (an encoding format) specified by the two-dimensional barcode. For example only, for a QR code that specifies alphanumeric encoding may use 11 bits to encode 2 of a limited set of characters outlined in ISO/IEC 18004:2000 (E). This encoding format can be used to encode 45 different characters, most of which can be safely added to a URL parameter. With 11 bits, decimal numbers ranging from 0 to 2047 can be encoded. For example, to generate 11 bits you can look up characters 1 and 2, which will each have a value from 0 and 44. The following sum can then be calculated: (character 1 value)*45+character 2 value). If both characters 1 and 2 were equal to the highest values character, 44, the sum would be 2024. Therefore, the values from 2025 to 2047 could never be seen or used according to this encoding format, which could cause an issue when decoding if they appeared in the image.

In order to handle the situation described above, the image data generation module 320 can alter the string of bits in order to comply with the format of the two-dimensional barcode. Rather, the image data generation module 320 can generate one or more characters nearest or closest to the string of bits, but also in compliance with the format of the two-dimensional barcode. The image data generation module 320 can also maintain information about this alteration such that the first data can be adjusted to undo the alterations in order to recover the modified image after generating the ECC using the altered first data. In other words, adjusting the string of bits or the one or more characters could alter the modified image. Alternatively, the image data generation module 320 could convert the string of bits to the one or more characters in violation of the format of the two-dimensional barcode. The barcode generation module 204 could then rely on an ECC (discussed in detail below) to fix the violation. Reliance on the ECC, however, can be limited to a predetermined amount of data. As previously mentioned, information can be maintained in order to properly display the modified image as part of the two-dimensional barcode.

The URL modification module 324 can receive the string of bits or the one or more characters from the image data generation module 320 and can generate a first modified URL using (i) the URL and the one or more characters or (ii) the string of bits and the URL. Specifically, the URL modification module 324 can append the one or more characters at an end of the URL to obtain the first modified URL. The one or more characters can be appended to the end of the URL after an indicator character. The indicator character, e.g., ?, can inform a web browser executing on a computing device, e.g., mobile computing device 128, that any data following the indicator character is a parameter for the web page (which is specified before the indicator character). The one or more characters, however, represent the image data, which may be a valid parameter for the URL, but may not be a valid parameter for the web server. The web server, therefore, can ignore the parameter and transmit the source document for the web page according to the address before the indicator character. For example, in this situation the altering or fixing (via ECC) of the string of bits may not be required. Alternatively, the URL modification module 324 could append the string of bits after a null terminator bit of the two-dimensional barcode. In this manner, when scanned by a computing device executing two-dimensional barcode reader software, e.g., mobile computing device 128, the string of bits after the terminator bit can be ignored and only the URL could be read.

The URL data generation module 328 can receive the first modified URL from the URL modification module 324 and can generate a second portion of the two-dimensional barcode by encoding the first modified URL. The URL data generation module 328 can generate the second portion of the two-dimensional barcode according to the specified format of the two-dimensional barcode (QR code, Aztec code, Data Matrix code, etc.). The URL data generation module 328, therefore, can perform any suitable encoding techniques associated with the specific format for the two-dimensional barcode. It should be appreciated that when the URL shortening is used, the URL modification module 324 can generate the first modified URL using the second modified URL.

Similarly, the ECC data generation module 332 can generate a third portion of the two-dimensional barcode by encoding ECC data. The ECC data can be used to recover the data (the first modified URL) and therefore can be based on the first data and the second data. The ECC data generation module 332 can generate the third portion of the two-dimensional barcode according to the specified format of the two-dimensional barcode (QR code, Aztec code, Data Matrix code, etc.). Alternatively, in some implementations the third portion of the two-dimensional barcode can be user-defined or otherwise customizable. The ECC data generation module 332, therefore, can perform any suitable encoding techniques associated with the desired ECC data for the two-dimensional barcode. For example only, for QR codes the ECC data may be Reed-Solomon error correction code having one or more error correction levels.

When the two-dimensional barcode(s) are QR codes, the mask selection module 336 can be implemented. The mask selection module 336 can select one of a plurality of masks to apply to the two-dimensional barcode to obtain a selected mask. Each of the plurality of masks can represent a different mathematical pattern, e.g., based on a mathematical formula, for inverting pixels of the two-dimensional barcode. For example, the plurality of masks may include alternating pixels (a "checkerboard"), alternating horizontal lines, alternating vertical lines, alternating diagonal lines, etc., where alternating refers to black/white or otherwise contrasting elements. The mask selection module 336 can obtain the selected mask by selecting one of the plurality of masks that produces less than or equal to an acceptable number of optical problems when applied to the two-dimensional barcode. Specifically, the acceptable number of optical problems can refer to the an acceptable noise in the two-dimensional barcode after the mask is applied. In particular, the acceptable number of optical problems may be with respect to the third portion (the ECC data) of the two-dimensional barcode. In other words, the mask selection module 336 can perform an iterative process of testing each of the plurality of masks to obtain the selected mask. For example only, for QR codes the plurality of selected masks can include eight different masks. Alternatively, in some implementations the mask selection module 336 may obtain the selected mask by selecting one of the plurality of masks at random. In other words, the selected mask can be chosen such that the modified image is correctly displayed in the two-dimensional barcode after the selected mask has been applied. In some implementations, the mask selection module 336 may communicate with the image data generation module 320 in order to generate data that has the selected mask already integrated.

The barcode assembly module 340 can receive the first, second, and third portions of the two-dimensional barcode. When QR code(s) are being generated, the barcode assembly module 340 can also receive the selected mask. The barcode assembly module 340 can generate (or "assemble") the two-dimensional barcode by compiling the first, second, and third portions and, if applicable, applying the selected mask. The barcode assembly module 340 can operate in conjunction with the mask selection module 336 in order to obtain the selected mask. Further, in some implementations, the barcode assembly module 340 can apply the selected mask during the generation of the two-dimensional barcode, i.e., the compiling of the first, second, and third portions. If QR code(s) are not being generated, the barcode assembly module 340 can generate the two-dimensional barcode(s) using the first, second, and third portions. The barcode assembly module 340 can then output the two-dimensional barcode to the data output device 212 and/or the animation generation module 344.

Figure 4A:
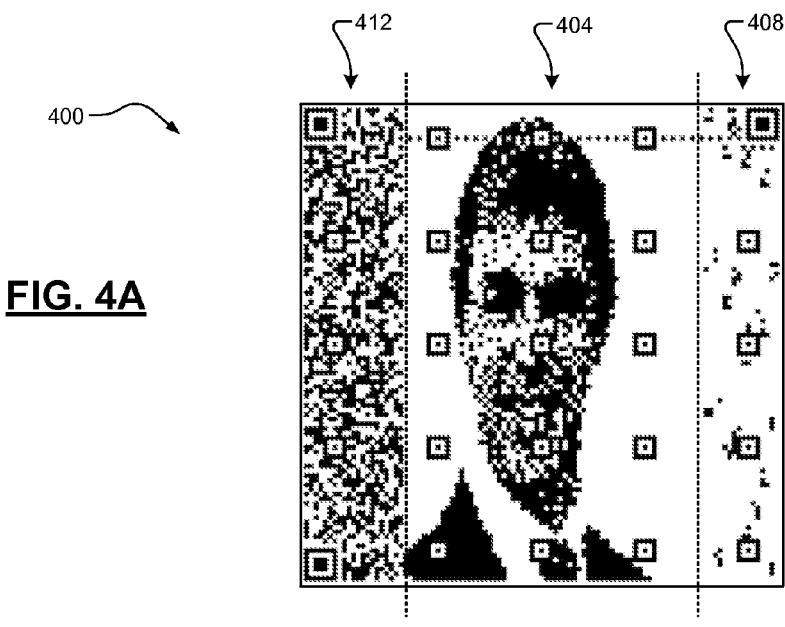
FIG. 4A is an illustration of a two-dimensional barcode generated according to some implementations of the present disclosure.

Referring now to FIG. 4A, an example two-dimensional barcode 400 generated according to the techniques of the present disclosure is illustrated. As previously described, the two-dimensional barcode 400 can be generated by compiling a first portion 404, a second portion 408, and a third portion 412. The first portion 404 can represent the image data. The second portion 408 can represent the modified (shortened) URL. As shown, the second portion 408 can include less data due to the shortening of the URL, thereby providing for more area for the image shown in the first portion 404. The third portion 412 can represent the ECC data. It should be appreciated that while this configuration of the first, second, and third portions is illustrated, other configurations can be implemented. For example, the two-dimensional barcode 400 can be rotated 90° counterclockwise, such that the second portion 408 is at the top of the two-dimensional barcode 400 and the third portion 412 is at the bottom of the two-dimensional barcode 400 (see, for example, FIG. 4B).

Referring again to FIG. 3, while generation of a single two-dimensional barcode is discussed above, the barcode generation module 204 can be further configured to generate an animated two-dimensional barcode. The animated two-dimensional barcode can be formed using a plurality of two-dimensional barcodes generated as described above. A plurality of related images (collectively forming an animation) can be provided to the barcode generation module 204. The animation generation module 344 can receive the plurality of two-dimensional barcodes associated with the plurality of images from the barcode assembly module 340. The animation generation module 344 can then generate the animated two-dimensional barcode using the plurality of two-dimensional barcodes.

Figure 4B:
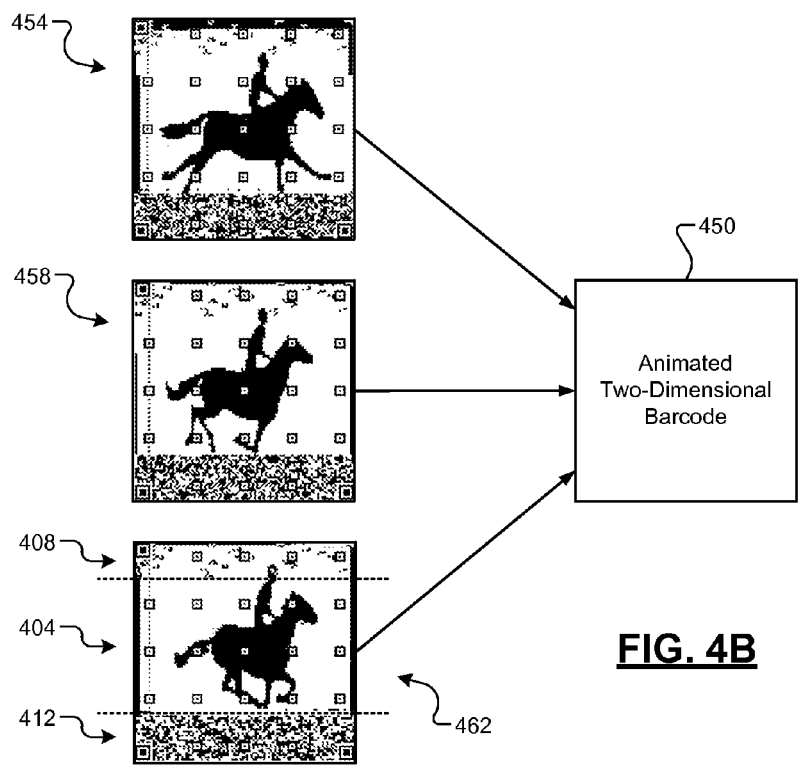
FIG. 4B is an illustration of a plurality of two-dimensional barcodes collectively forming an animated two-dimensional barcode generated according to some implementations of the present disclosure.

Referring now to FIG. 4B, an example customized animated two-dimensional barcode 450 generated according to the techniques of the present disclosure is illustrated. As previously described, the animated two-dimensional barcode 450 can be generated using a plurality of two-dimensional barcodes 454, 458, and 462, corresponding to a plurality of related images, respectively. It should be appreciated that while three two-dimensional barcodes 454, 458, and 462 are shown, the animated two-dimensional barcode 450 can be generated using other numbers of two-dimensional barcodes. As shown in FIG. 4B, the plurality of images represent a human riding a horse at various points during the horse's galloping stride. Each of the two-dimensional barcodes 454, 458, and 462 can be generated by the barcode generation module 204 as previously described herein. For example, the first, second, and third portions 404, 408, and 412, respectively, of two-dimensional barcode 462 are indicated. When scanned, each of the two-dimensional barcodes 454, 458, and 462 can provide access to the first modified URL. In other words, even though the animated two-dimensional barcode 450 can be changing throughout the animation loop, the animated two-dimensional barcode 450 can provide access to the first modified URL when scanned at any point during the animation cycle (or "loop").

Referring again to FIG. 3, the two-dimensional barcode (or the animated two-dimensional barcode) can then be output to the data output device 212. The data output device 212 can then output the two-dimensional barcode. For example, the data output device 212 can display the two-dimensional barcode at a display of the computing device 104. Alternatively, for example, the data output device 212 can transmit the two-dimensional barcode to another computing device via the network 120. When displayed at the computing device 104, the two-dimensional barcode (or animated two-dimensional barcode) can then be scanned by the mobile computing device 128 executing two-dimensional barcode reader/scanner software. Scanning of the two-dimensional barcode can cause the mobile computing device 128 to transmit a request for the web page associated with the first modified URL to a web server, e.g., server 116 if properly configured. The request can cause the web server to ignore the first data appended at the end of the first modified URL or after the terminator bit, and thereby can cause the web server to transmit a source document for the web page associated with the URL to the mobile computing device 128.

Figure 5:
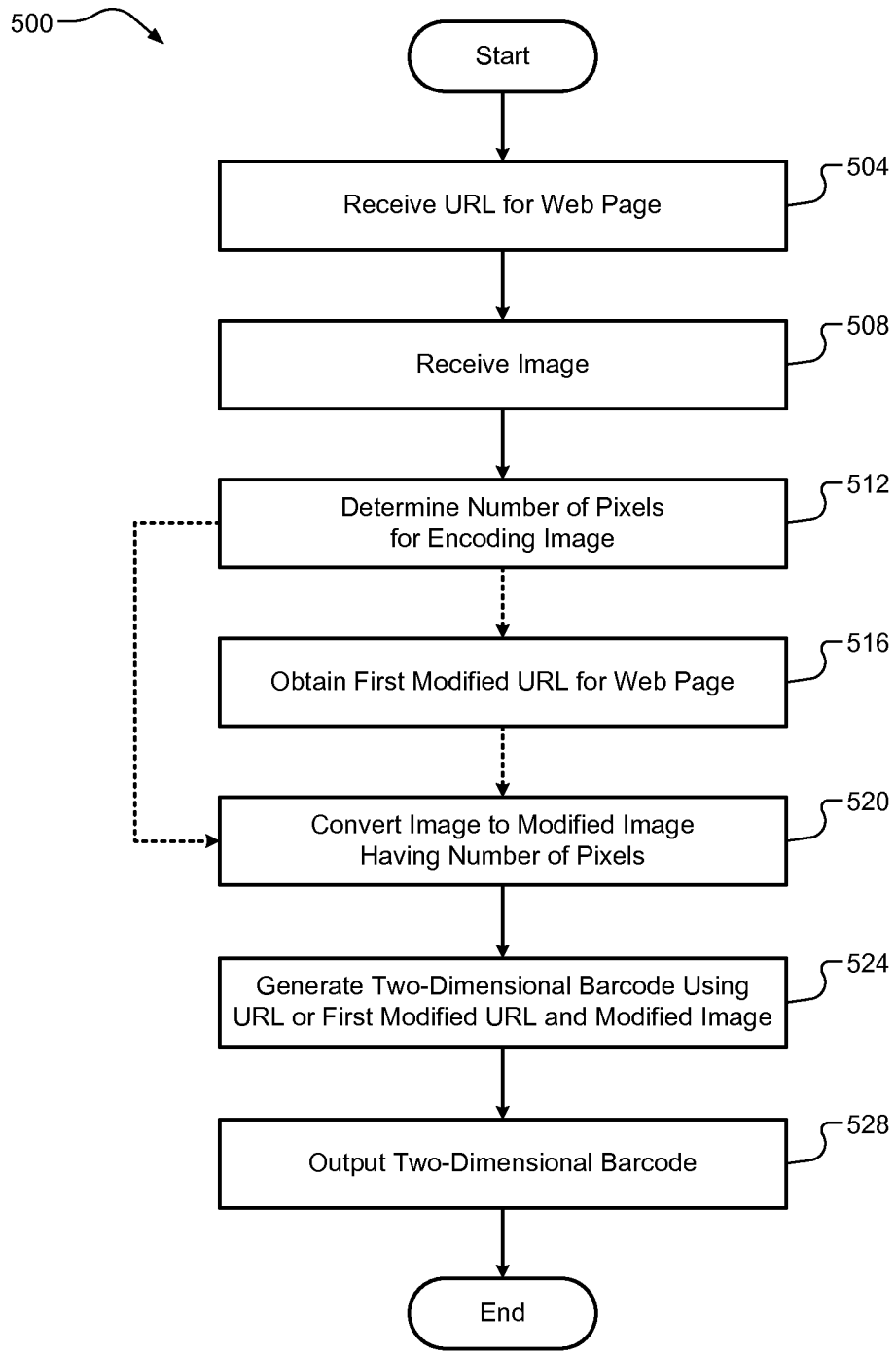
FIG. 5 is a flow diagram of an example technique for generating a customized two-dimensional barcode according to some implementations of the present disclosure.

Referring now to FIG. 5, an example technique 500 for generating a customized two-dimensional barcode is illustrated. At 504, the computing device 104 can receive a URL for a web page. At 508, the computing device 104 can receive an image. At 512, the computing device 104 can determine a number of pixels corresponding to a desired resolution for encoding the image. In some implementations, at 516, the computing device 104 can obtain a second modified URL for the web page, the second modified URL being associated with the URL and being shorter than the URL. At 520, the computing device 104 can convert the image to a modified image having the number of pixels. At 524, the computing device 104 can generate a two-dimensional barcode using the URL (or the second modified URL) and the modified image.

The generating of the two-dimensional barcode can include (i) generating first data representative of the modified image, (ii) appending the first data to an end of the URL (or the second modified URL) to obtain a first modified URL or after a terminator bit of the two-dimensional barcode, (iii) generating second data representative of the first modified URL or the URL, and (iv) generating third data representative of an ECC based on the first data and the second data, wherein the two-dimensional barcode is generated based on the first data, the second data, and the third data. At 528, the computing device 104 can output the two-dimensional barcode. The technique 500 can then end or return to 504 for one or more additional cycles.

Figure 6:
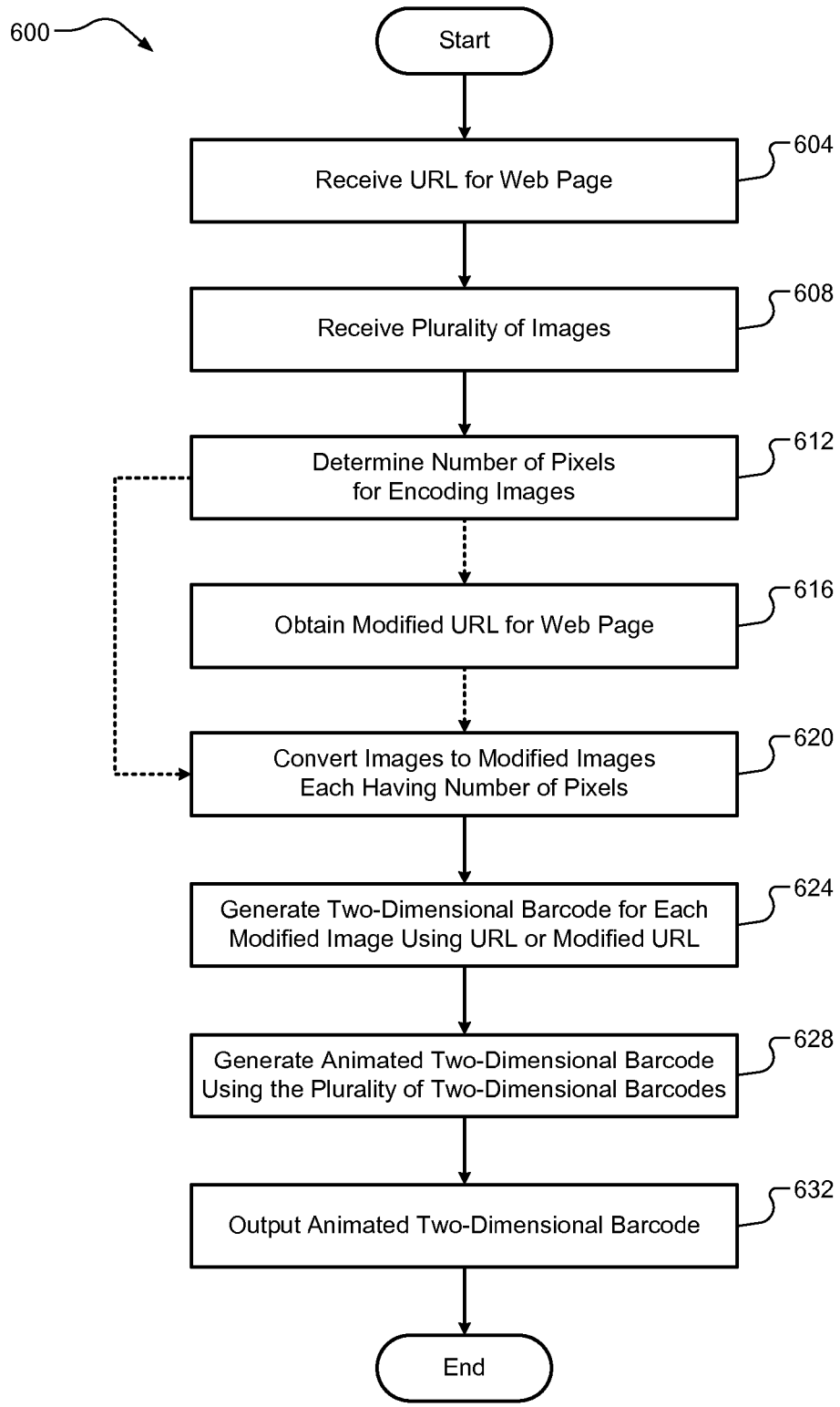
FIG. 6 is a flow diagram of an example technique for generating a customized, animated two-dimensional barcode according to some implementations of the present disclosure.

Referring now to FIG. 6, an example technique 600 for generating a customized, animated two-dimensional barcode is illustrated. At 604, the computing device 104 can receive a URL for a web page. At 608, the computing device 104 can receive a plurality of images that collectively form an animation. At 612, the computing device 104 can determine a number of pixels corresponding to a desired resolution for encoding each of the plurality of images. In some implementations, at 616, the computing device 104 can obtain a second modified URL for the web page, the second modified URL being associated with the URL and being shorter than the URL. At 620, the computing device can convert the plurality of images to a plurality of modified images each having the number of pixels. At 624, the computing device 104 can generate a two-dimensional barcode for each of the plurality of modified images using the URL (or the second modified URL) to obtain a plurality of two-dimensional barcodes.

The generating of a specific two-dimensional barcode can include: (i) generating first data representative of a specific modified image, (ii) appending the first data at an end of the URL (or the second modified URL) after a parameter indicator character to obtain a first modified URL or after a terminator bit of the specific two-dimensional barcode, (iii) generating second data representative of the first modified URL or the URL, and (iv) generating third data representative of an ECC based on the first data and the second data, wherein the specific two-dimensional barcode is generated based on the first data, the second data, and the third data. At 628, the computing device 104 can generate an animated two-dimensional barcode based on the plurality of two-dimensional barcodes. At 632, the computing device 104 can output the animated two-dimensional barcode. The technique 600 can then end or return to 604 for one or more additional cycles.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
receiving, at a first computing device including one or more processors, a uniform resource locator (URL) for a web page;
receiving, at the first computing device, a plurality of images that collectively form an animation;
determining, at the first computing device, a number of pixels corresponding to a desired resolution for encoding each of the plurality of images;
converting, at the first computing device, the plurality of images to a plurality of modified images each having the number of pixels;
generating, at the first computing device, a quick response (QR) code for each of the plurality of modified images using the URL to obtain a plurality of QR codes, the generating of a specific QR code including:
generating first data representative of a specific modified image,
appending the first data (i) at an end of the URL after a parameter indicator character to obtain a first modified URL or (ii) after a terminator bit of the QR code,
generating second data representative of the first modified URL or the URL, and
generating third data representative of an error correction code (ECC) based on the first data and the second data,
wherein the specific QR code is generated based on the first data, the second data, and the third data, wherein the first data, the second data, and the third data are associated with a first portion, a second portion, and a third portion of the specific QR code, respectively, and wherein the first, second, and third portions are distinct, non-overlapping portions of the QR code;
generating, at the first computing device, an animated QR code based on the plurality of QR codes; and
outputting, at the first computing device, the animated QR code.

2. A computer-implemented method, comprising:
receiving, at a first computing device including one or more processors, a uniform resource locator (URL) for a web page;
receiving, at the first computing device, a plurality of images that collectively form an animation;
determining, at the first computing device, a number of pixels corresponding to a desired resolution for encoding each of the plurality of images;
converting, at the first computing device, the plurality of images to a plurality of modified images each having the number of pixels;
generating, at the first computing device, a two-dimensional barcode for each of the plurality of modified images using the URL to obtain a plurality of two-dimensional barcodes, the generating of a specific two-dimensional barcode including:
generating first data representative of a specific modified image,
appending the first data (i) at an end of the URL after a parameter indicator character to obtain a first modified URL or (ii) after a terminator bit of the two-dimensional barcode,
generating second data representative of the first modified URL or the URL, and
generating third data representative of an error correction code (ECC) based on the first data and the second data, wherein the specific two-dimensional barcode is generated based on the first data, the second data, and the third data;

generating, at the first computing device, an animated two-dimensional barcode based on the plurality of two-dimensional barcodes; and outputting, at the first computing device, the animated two-dimensional barcode.

3. The computer-implemented method of claim 2, wherein when the two-dimensional barcodes are quick response (QR) codes, the generating of the specific two-dimensional barcode further comprises:

selecting, at the first computing device, one of a plurality of masks to obtain a selected mask, each of the plurality of masks representing a different mathematical pattern for inverting pixels of the specific two-dimensional barcode, wherein the selected mask represents the one of the plurality of masks that produces less than or equal to an acceptable number of optical problems when applied to the specific two-dimensional barcode; and applying, at the first computing device, the selected mask to the specific two-dimensional barcode to obtain a specific modified two-dimensional barcode, wherein generating the animated two-dimensional barcode uses the specific modified two-dimensional barcode, the specific modified two-dimensional barcode specifying the selected mask.

4. The computer-implemented method of claim 2, further comprising obtaining a second modified URL that is associated with the URL and is shorter than the URL, wherein obtaining the second modified URL includes:

transmitting, from the first computing device, a request to shorten the URL to a server via a network, the server being configured to perform URL shortening; and receiving, at the first computing device, the second modified URL from the server in response to the request, wherein the generating of the plurality of two-dimensional barcodes includes using the second modified URL.

5. The computer-implemented method of claim 2, wherein generating the first data representative of the specific modified image includes:

generating, at the first computing device, a string of bits representative of the specific modified image; and generating, at the first computing device, one or more characters representative of the string of bits to obtain the first data, wherein the first data is appended at the end of the URL after the parameter indicator character to obtain the first modified URL and the second data is generated using the first modified URL.

6. The computer-implemented method of claim 2, wherein generating the first data representative of the specific modified image includes generating, at the first computing device, a string of bits representative of the specific modified image to obtain the first data, wherein the first data is appended after the terminator bit of the specific two-dimensional barcode and the second data is generated using the URL.

7. The computer-implemented method of claim 2, wherein the first data, the second data, and the third data are associated with a first portion, a second portion, and a third portion of the two-dimensional barcode, respectively, wherein the first, second, and third portions are distinct, non-overlapping portions of the two-dimensional barcode.

8. The computer-implemented method of claim 7, wherein the first portion is arranged between the second and third portions of the two-dimensional barcode.

9. The computer-implemented method of claim 2, wherein the first computing device is a server, wherein the URL and the plurality of images are received at the first computing device via a network, and wherein the animated two-dimensional barcode is output via the network.

10. The computer-implemented method of claim 9, wherein the URL and the plurality of images are received at the first computing device via the network from a user at a second computing device, and wherein the animated two-dimensional barcode is output via the network to the user at the second computing device.

11. The computer-implemented method of claim 2, wherein when scanned by a second computing device executing a two-dimensional barcode reader at any time during a cycle of the animated two-dimensional barcode, the animated two-dimensional barcode causes the second computing device to transmit a request for the web page associated with the first modified URL to a web server, the request causing the web server to ignore the first data appended at the end of the first modified URL after the parameter indicator character or after the terminator bit, thereby causing the web server to transmit a source document for the web page indicated by the URL to the second computing device.

12. A computing device, comprising:

a data input device configured to:
receive a uniform resource locator (URL) for a web page, and
receive a plurality of images that collectively form an animation;

one or more processors configured to:
determine a number of pixels corresponding to a desired resolution for encoding each of the plurality of images;
convert the plurality of images to a plurality of modified images each having the number of pixels,
generate a two-dimensional barcode for each of the plurality of modified images using the URL to obtain a plurality of two-dimensional barcodes, the generating of a specific two-dimensional barcode including:
generating first data representative of a specific modified image,
appending the first data (i) at an end of the URL after a parameter indicator character to obtain a first modified URL or (ii) after a terminator bit of the specific two-dimensional barcode,
generating second data representative of the first modified URL or the URL, and
generating third data representative of an error correction code (ECC) based on the first data and the second data,
wherein the specific two-dimensional barcode is generated based on the first data, the second data, and the third data, and
generate an animated two-dimensional barcode based on the plurality of two-dimensional barcodes; and a data output device configured to output the animated two-dimensional barcode.

13. The computing device of claim 12, wherein when the two-dimensional barcodes are quick response (QR) codes, the one or more processors are further configured to generate the specific two-dimensional barcode by:

selecting one of a plurality of masks to obtain a selected mask, each of the plurality of masks representing a different mathematical pattern for inverting pixels of the specific two-dimensional barcode, wherein the selected mask represents the one of the plurality of masks that produces less than or equal to an acceptable number of optical problems when applied to the specific two-dimensional barcode; and applying, at the first computing device, the selected mask to the specific two-dimensional barcode to obtain a specific modified two-dimensional barcode, wherein the one or more processors are configured to generate the animated two-dimensional barcode based on the specific modified two-dimensional barcode, the specific modified two-dimensional barcode specifying the selected mask.

14. The computing device of claim 12, wherein the one or more processors are further configured to obtain a second modified URL that is associated with the URL and is shorter than the URL by:

transmitting, from the data output device, a request to shorten the URL to a server via a network, the server being configured to perform URL shortening; and receiving, at the data input device, the second modified URL from the server in response to the request, wherein the one or more processors are configured to generate the plurality of two-dimensional barcodes using the second modified URL.

15. The computing device of claim 12, wherein the one or more processors are further configured to generate the first data representative of the specific modified image by:

generating a string of bits representative of the specific modified image; and generating one or more characters representative of the string of bits to obtain the first data, wherein the one or more processors are configured to append the first data at the end of the URL after the parameter indicator character to obtain the first modified URL and to generate the second data using the first modified URL.

16. The computing device of claim 12, wherein the one or more processors are further configured to generate the first data representative of the specific modified image by:

generating a string of bits representative of the specific modified image to obtain the first data, wherein the one or more processors are configured to append the first data after the terminator bit of the specific two-dimensional barcode and to generate the second data using the URL.

17. The computing device of claim 12, wherein the first data, the second data, and the third data are associated with a first portion, a second portion, and a third portion of the two-dimensional barcode, respectively, wherein the first, second, and third portions are distinct, non-overlapping portions of the two-dimensional barcode.

18. The computing device of claim 17, wherein the first portion is arranged between the second and third portions of the two-dimensional barcode.

19. The computing device of claim 12, wherein the computing device is a server, wherein the data input device is configured to receive the URL and the plurality of images via a network from a user at another computing device, and wherein the data output device is configured to output the animated two-dimensional barcode via the network to the user at the other computing device.

20. The computing device of claim 12, wherein when scanned by another computing device executing a two-dimensional barcode reader at any time during a cycle of the animated two-dimensional barcode, the animated two-dimensional barcode causes the other computing device transmit a request for the web page associated with the first modified URL to a web server, wherein the request causes the web server to ignore the first data appended at the end of the first modified URL after the parameter indicator character or after the terminator bit, thereby causing the web server to transmit a source document for the web page associated with the URL to the other computing device.

\* \* \* \* \*